United States Patent [19]

Gleasman et al.

[11] 4,191,071
[45] Mar. 4, 1980

[54] TORQUE EQUALIZER OR UNBALANCER FOR A CROSS-AXIS PLANETARY DIFFERENTIAL GEAR COMPLEX

[76] Inventors: Vernon E. Gleasman, 3808 Kirkwood Rd., Cleveland, Ohio 44121; Robert N. Benjamin, 1830 Kathryn Dr., Westlake, Ohio 44145

[21] Appl. No.: 526,635

[22] Filed: Nov. 25, 1974

Related U.S. Application Data

[63] Continuation-in-part of Ser. No. 433,741, Jan. 16, 1974, abandoned.

[51] Int. Cl.² .............................................. F16H 1/38
[52] U.S. Cl. ........................................................ 74/715
[58] Field of Search ............... 74/715, 710.5; 308/235; 180/88

[56] References Cited

U.S. PATENT DOCUMENTS

| | | | |
|---|---|---|---|
| 2,070,569 | 2/1937 | Asam | 74/715 |
| 2,272,161 | 4/1940 | Frederickson | 74/715 |
| 2,666,343 | 1/1954 | Casa-Massa | 74/715 |
| 2,859,641 | 11/1958 | Gleasman | 74/715 |
| 3,253,483 | 5/1966 | McGaw | 74/715 X |
| 3,433,543 | 3/1969 | Eck | 308/235 |
| 3,742,783 | 7/1973 | Skealy | 74/710.5 |
| 3,875,824 | 4/1975 | Benjamin | 74/715 |

*Primary Examiner*—C. J. Husar
*Assistant Examiner*—Frank McKenzie
*Attorney, Agent, or Firm*—Baldwin, Egan, Walling & Fetzer

[57] ABSTRACT

In a differential gear mechanism housed in a case and having a power input and having two output shafts extending outwardly through the case for delivering drive torque to the two output shafts, each of said shafts driven by a helical side gear, said side gears axially aligned in contiguous relationship so that the end thrust of both of them is additive toward one output shaft, and a friction-reducing washer is provided surrounding said one of said output shafts in position to take end thrust between the traction gear associated with said shaft and the case, whereby to substantially equalize the torque delivered to the two output shafts; or one or more friction-increasing washers are provided surrounding one of said two output shafts in position to take end thrust between the differential and the case, whereby to decrease the torque delivered to said shaft when necessary to provide a predetermined control of torque, as from a transfer case.

3 Claims, 7 Drawing Figures

TORQUE EQUALIZER OR UNBALANCER FOR A CROSS-AXIS PLANETARY DIFFERENTIAL GEAR COMPLEX

BACKGROUND OF THE INVENTION

This application is a continuation-in-part application of our pending application Ser. No. 433,741, filed Jan. 16, 1974 now abandoned.

Bearings are usually used for increasing the performance life of machinery and for causing it to run more easily. The present invention, however, utilizes a friction-modifying bearing to provide a predetermined split of power or torque between two output shafts of a specific differential mechanism.

For various reasons the torque delivered to the two output shafts of a differential gearing mechanism are often unequal. In such a case, especially when the differential gearing mechanism is driving two opposed drive wheels on a vehicle, if it is desired to equalize the torque delivered to the two output shafts, a friction-reducing washer, as described in connection with this invention, when applied to that output shaft which otherwise would receive the lesser torque, applied at the point where the output shaft emerges from the differential case, will correct the situation. On the other hand, where it is desirable to have a predetermined division between the torque delivered to one output shaft as compared to the other output shaft of the same differential mechanism, as for instance, in a transfer case dividing the power delivered to the drive axles of a multi-wheel drive vehicle, then this invention teaches the provision of one or more friction-reducing washers to take the end thrust exerted on that output shaft which desirably should receive the greater torque, when positioned at the point of exit of that shaft through the differential case will satisfactorily divide the power between the two axles. Also, one may decrease the torque delivered from a transfer case differential to provide less power delivered to one drive axle by providing at that shaft whose torque is to be decreased, a friction-increasing washer to receive the end thrust where that particular output shaft emerges from the transfer case.

An object of the present invention is to provide a very simple structure which will serve in one case to substantially equalize the torque delivered at the two output shafts of a differential gearing mechanism, as compared to the torque output at the other shaft; or to deliberately decrease the torque output to one of the two output shafts of a differential gear mechanism as compared to the torque delivered to the other shaft of the same mechanism.

Other objects and advantages of this invention will be apparent from the accompanying drawings and description and the essential features thereof will be set forth in the appended claims.

In the drawings,

FIG. 6 is an elevational view of a differential gearing mechanism similar to that shown in FIG. 1 but with a friction-increasing washer in place of the friction-reducing washer of FIG. 1; while

Figure 1:
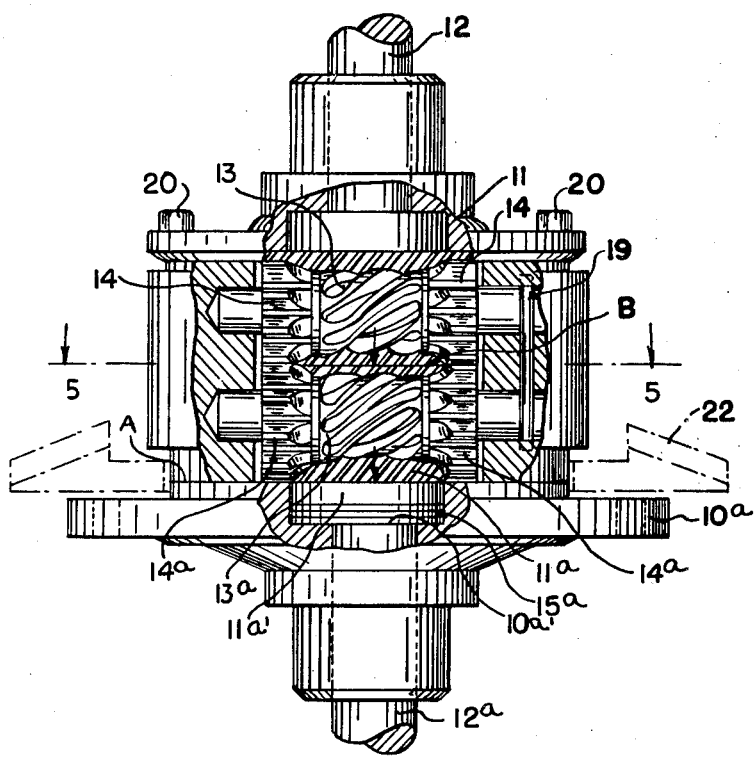
FIG. 1 is an elevational view of a preferred type of differential gear mechanism, with parts broken away in section to show how the present invention is applied thereto.
Figure 5:
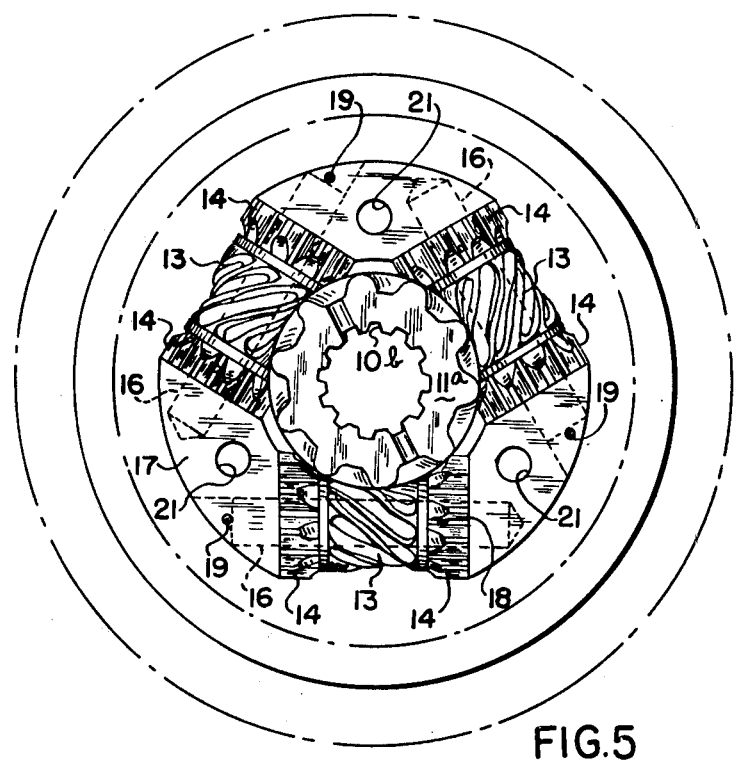
FIG. 5 is a plan view taken along the line 5—5 of FIG. 1 showing the details of the transfer and balancing gear complexes and their manner of coaction with an associated side gear or traction gear.
Figure 6:
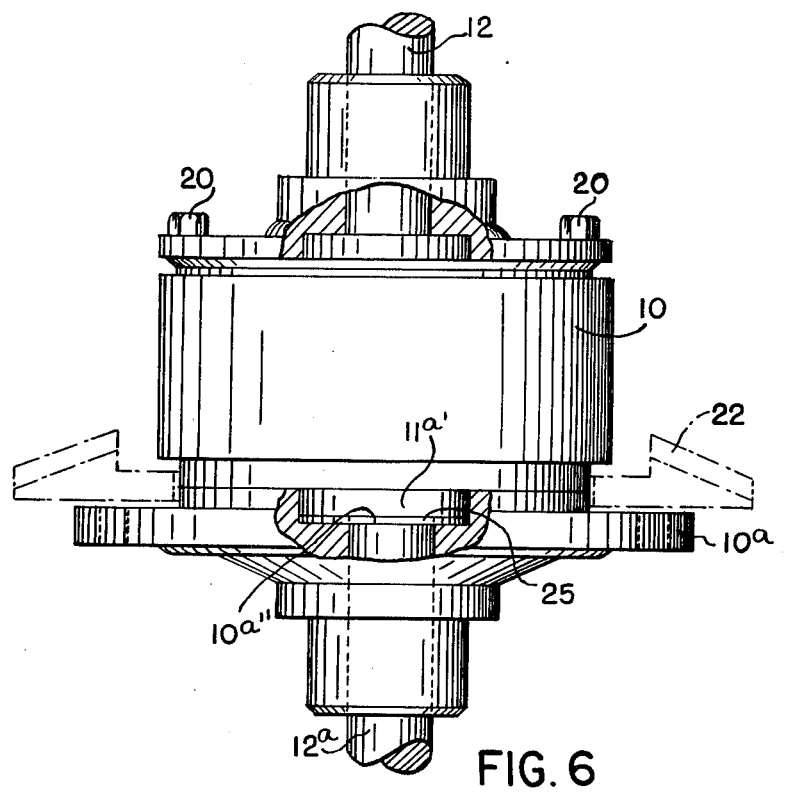

FIGS. 1 and 5 show this invention as applied to a differential gear mechanism which is fully disclosed and described in the copending application of Robert N. Benjamin, Ser. No. 265,249, filed June 22, 1972. Such a differential gear mechanism comprises two substantially identical gear sets in a housing or cage 10 adapted to be driven by a drive shaft or propeller shaft which often is coupled to a ring gear 22 bolted to a flange 10a which is rigidly connected with the housing or cage 10. Each gear set has a central helical or traction gear 11 or 11a, sometimes called a side gear, adapted to be keyed in one instance, as seen in FIG. 6, by keyways 10b to one of the stub shafts 12 or 12a leading to a rear or drive wheel of an automotive vehicle. Each of these side gears is in mesh with a plurality of transfer gear complexes, each having located centrally thereof a worm wheel or helical portion 13 or 13a in mesh with its associated side gear and having a reversible balancing gear 14 or 14a at each end of the helical portion, rigidly connected with the associated helical portion and coaxial therewith. The side gears 11 and 11a have their teeth inclined in the same direction which gives an end thrust, when driving, of say x pounds at the level of line B of FIG. 1 above which is one of the gear sets and below which is the other of the gear sets and with the side gears 11 and 11a in direct contact at the level of the line B. The end thrust due to the side gear 11a is in the same direction as the end thrust from the side gear 11 and which is effective at the level A which is the lower end of hub 11a' which is integral with the side gear 11a. Thus, the total resultant force at the level A is 2x pounds. The hub 10' is referred to in the claims as part of its associated side gear.

Figure 2:
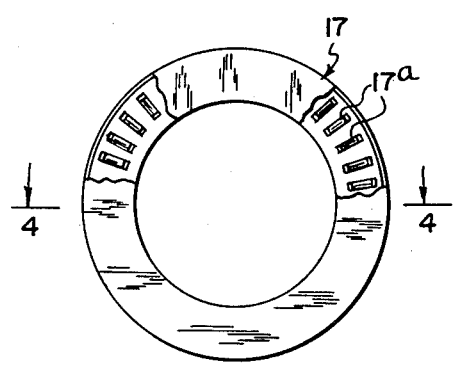
FIG. 2 is a top plan view, enlarged, of a friction-reducing washer shown in FIG. 1, with parts broken away to more clearly show the construction.
Figure 3:
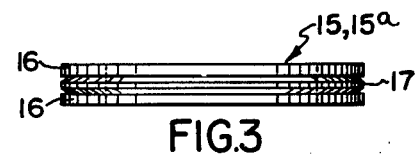
FIG. 3 is a side elevational view of the friction-reducing washer of FIG. 2.
Figure 4:
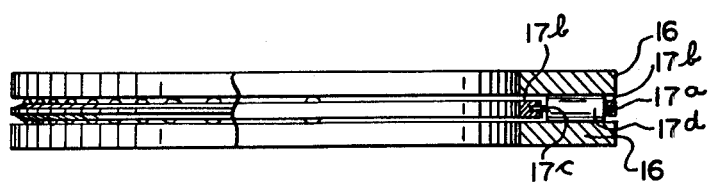
FIG. 4 is a side elevational view, enlarged, of the same structure as shown in FIGS. 2 and 3, with parts broken away in section to more clearly show the internal construction.

The present invention serves to balance the torque delivered to the stub shafts 12 and 12a by interposing between the end of the hub 11a' and a shoulder 10a' of the casing, or cage, a friction-reducing washer. While this might take several forms, a preferred form is shown in FIGS. 2, 3 and 4. This comprises a sandwich which has an end thrust washer bearing 17 between two flat plain washers 16. Referring to FIGS. 2 and 4, the member 17 comprises a large plurality of very small rollers 17a which are captured in openings in a plate 17b which has bifurcated portions at its outer annular rim and within these portions there are through openings 17c in each of which is captured one of the rollers 17a. The outermost periphery of the washer 17 has its ends secured together as indicated at 17d. Each roller 17a is of greater diameter than the thickness of the plate portions 17b so that each roller moves freely in a circumferential direction between the washer 16 which completes the sandwich. Note the rollers 17a are radially oriented and roll very freely since they are not provided with a central shaft. The entire sandwich 16, 17 in this preferred form is only slightly over ¼ inch in thickness so that it takes up very little room in the differential housing. The sandwich 16, 17 may be substituted by the member 17 alone, held between hardened flat surfaces on the hub 11a' of side gear 11a and on the shoulder 10a' of the cage portion 10a, respectively.

This torque balancer unit, designated as a whole 15a at the lower end of FIG. 1, reduces the end thrust of x pounds due to side gear 11a to a very low value so that the end result of applying this invention to the gear mechanism shown in FIG. 1 is a thrust of x pounds of friction at the level B and approximately x pounds of friction at the level A. The friction at level B effects the torque shafts 12 and 12a equally.

The description thus far with respect to FIG. 1 describes the end thrust when the vehicle is being driven say in a forward direction. If the vehicle is driven in the opposite direction, then the end thrust of the side gears 11 and 11a is in the opposite direction or upwardly in FIG. 1. It if is desired to provide the same balancing action in this rearward direction as described previously in connection with the forward drive, then one of the sandwiches shown in FIGS. 2, 3 and 4 is placed in a similar position at the upper end of FIG. 1 where the stub shaft 12 emerges from the differential housing 10.

A modification of this invention may be utilized to arbitrarily increase the friction at one of the two output shafts of the differential by using a friction-increasing washer positioned similar to the friction-reducing structure designated 15a. Referring to FIG. 6, the structure is like that described in connection with FIG. 1 except that at the lower end of the differential gear mechanism the hub 11a' of the side gear 11a and a shoulder 10a" of the housing 10, there is placed an uninterrupted flat plain washer 25. This increases the friction where the output shaft 12a emerges from the differential mechanism housing 10. Such a structure would be useful for instance in a transfer case as shown at 101 in Gleasman U.S. Pat. No. 2,859,641, granted Nov. 11, 1958. Such a structure could be used to provide a predetermined split between the torque delivered through shaft 12 to one of the front or rear axles as against that delivered through shaft 12a to the other axle. The friction of washer 25 may be varied by grooves or the like on its opposite faces, such as oil grooves.

Additional information with respect to FIG. 5 includes the journal pins 16 which pass centrally through each of the transfer gear complexes and are received in suitable openings in the matrix 17 and held in position by pins 10. The openings 21 are to receive the bolts 20 which hold the upper and lower gear sets in the housing 10.

Figure 7:
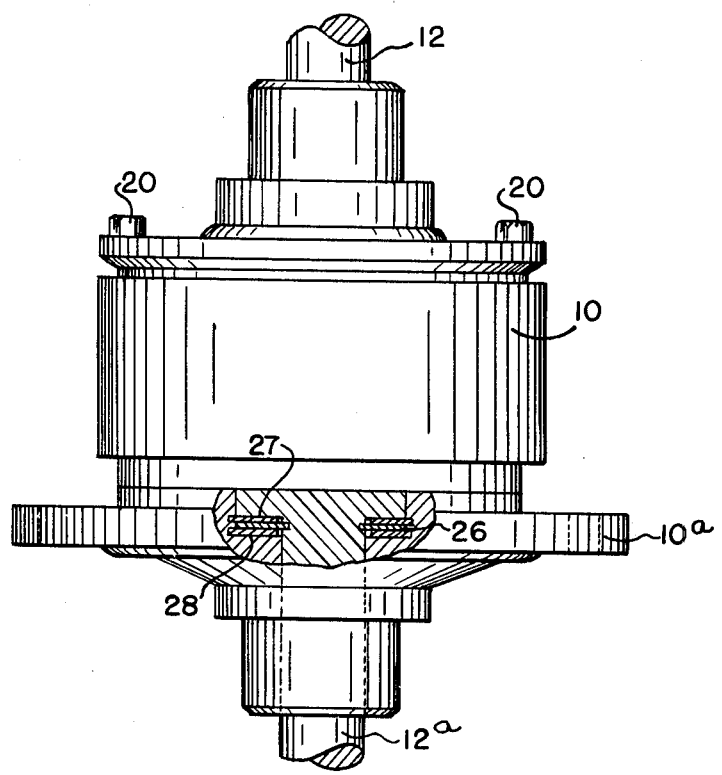
FIG. 7 is an elevational view similar to FIG. 6 with parts broken away to show multiple friction-increasing washers as contrasted to the single friction-increasing washer of FIG. 6.

FIG. 7 shows a modification of FIG. 6 where multiple friction discs 26 are provided to increase the friction where the shaft 12a emerges from the differential housing 10 so as to further reduce the torque delivered to the shaft 12a as compared to that delivered to the shaft 12. In this case, the hub of side gear 11a is shown integral with the shaft 12a into which is keyed flat annular friction disc 26 between flat annular discs or washers 27 and 28 which are keyed into housing or cage 10a. Axial play is provided between the discs which provides a sort of multiple disc brake arrangement further decreasing the torque delivered to the shaft 12a. This structure would be useful also in a transfer case to divide the torque between front and rear drive shafts connected respectively to the stub shafts 12 and 12a.

As used in the specification and claims herein the term "worm" or "worm gear" also includes helical gears, regardless of the helix angle.

This invention relates only to the type of differential shown and described in connection with FIGS. 1 and 5, which is defined herein as "a cross-axis planetary differential gear complex".

What is claimed is:

1. In combination, a differential gear mechanism housed in a case and having a power input and having two substantially identical gear sets, each set including a traction side gear each connected respectively with an associated output shaft extending outwardly through said case for delivering drive torque respectively to said two shafts, each of said gear sets including a plurality of transfer gear complexes, each complex having a centrally located helical portion in mesh with its associated side gear, each complex having a reversible balancing gear at each end of its associated helical portion, each balancing gear rigidly connected with its associated helical portion and coaxial therewith, said side gears assembled in axially aligned contiguous relationship in said case and with the helix angle of said side gears in the same relative position with their teeth inclined in the same direction so that the end thrust of said two side gears is additive in one direction toward one output shaft when said differential mechanism is propelling an associated vehicle in a given direction, and a friction-modifying washer applied at the point of exit from said case of said one output shaft only, and said washer being between and in contact with the side gear connected with said one shaft on one hand and with said case surrounding said one shaft on the other hand, whereby to substantially modify the torque delivered to said two output shafts by said differential gear mechanism.

2. The combination of claim 1, wherein the end thrust of said two side gears is additive in one direction toward one output shaft when said differential mechanism is propelling an associated vehicle in a given direction, and said washer is friction reducing and applied at said one output shaft only.

3. The combination of claim 1, wherein said friction-modifying washer is a friction-increasing washer.

* * * * *